United States Patent
Smith et al.

(10) Patent No.: US 9,223,576 B2
(45) Date of Patent: Dec. 29, 2015

(54) REDUCING A SET OF INSTRUCTIONS FOR EXECUTION ON A PROCESSOR AND EXPANDING A SET OF INSTRUCTIONS ON A PROCESSOR

(75) Inventors: Peter Smith, Cambridgeshire (GB); David Richard Hargreaves, Cambridge (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 1002 days.

(21) Appl. No.: 13/340,379

(22) Filed: Dec. 29, 2011

(65) Prior Publication Data

US 2012/0331273 A1  Dec. 27, 2012

(30) Foreign Application Priority Data

Dec. 30, 2010  (GB) .................................. 1022066.3

(51) Int. Cl.
G06F 9/30 (2006.01)

(52) U.S. Cl.
CPC .......... *G06F 9/3017* (2013.01); *G06F 9/30156* (2013.01); *G06F 9/30178* (2013.01); *G06F 9/30185* (2013.01)

(58) Field of Classification Search
CPC ............ G06F 9/30156; G06F 9/30178; G06F 9/30185
USPC ........................................................ 712/220
See application file for complete search history.

(56) References Cited

U.S. PATENT DOCUMENTS

| 5,502,826 | A | 3/1996 | Vassiliadis et al. |
| 6,194,740 | B1 * | 2/2001 | Zhang et al. ................... 257/59 |
| 6,219,779 | B1 * | 4/2001 | Takayama et al. ............ 712/210 |
| 6,301,651 | B1 | 10/2001 | Chang et al. |
| 2001/0002483 | A1 | 5/2001 | Roberts |

FOREIGN PATENT DOCUMENTS

WO   95/22102 A1   8/1995

OTHER PUBLICATIONS

Philips Inc., An Introduction to Very-long Instruction Word (VLIW) computer architecture, Aug. 6, 1997, Philips Semiconductors, Pub#: 9397-750-01759, pp. 1-11.*

UK Search Report dated Apr. 13, 2012, in corresponding GB application.

* cited by examiner

*Primary Examiner* — Andrew Caldwell
*Assistant Examiner* — Keith Nielsen
(74) *Attorney, Agent, or Firm* — The Marbury Law Group, PLLC

(57) ABSTRACT

A method of reducing a set of instructions for execution on a processor extracts information from a first instruction of the set of instructions. The method identifies unencoded space in one or more further instructions of the set of instructions and replaces the unencoded space of the one or more further instructions with the extracted information of the first instruction so as to form one or more amalgamated instructions. The method removes the first instruction from the set of instructions. A method of expanding a set of reduced instructions on a processor is also disclosed.

14 Claims, 1 Drawing Sheet

REDUCING A SET OF INSTRUCTIONS FOR EXECUTION ON A PROCESSOR AND EXPANDING A SET OF INSTRUCTIONS ON A PROCESSOR

BACKGROUND OF THE INVENTION

This invention relates generally to instruction set computing. In particular the invention relates to reducing a set of instructions for execution on a processor. The invention also relates to expanding a set of reduced instructions.

Typical instruction set computing architectures use fixed length instructions. In many instructions only a subset of the total number of bits in the instruction are required to express the information content of the instruction. However, for the purpose of maintaining synchronisation with other instructions and the processor that is to execute the instruction set, each instruction has a fixed length defined by the particular protocol being used. Those bits of the instruction which are not used to express the information content of the instruction are left unencoded. Such instruction sets are inefficient because they use more bits than are necessary to carry the information content of the instructions.

As an example, some processors (for example those operating the reduced instruction set computer architecture MIPS-16) make use of prefixes. A prefix is an instruction which is associated with another instruction. A prefix contains the same number of bits as the instruction with which it is associated. For example, the MIPS-16 architecture uses short instructions each having 16 bits. Both an MIPS prefix and the MIPS instruction with which it is associated have 16 bits. Generally, a prefix extends the operand of the instruction with which it is associated. Often not all of the bits of the prefix are required to perform this function. However to retain alignment in the instruction set, the prefix maintains the same number of bits as the instruction with which it is associated. Those bits of the prefix required to perform the function of the prefix are encoded, and the remaining bits are left unencoded and ignored.

There is therefore a need to increase the efficiency of instruction sets whilst also maintaining synchronisation of the instructions within the instruction set such that a processor executing the instructions is also able to maintain synchronisation.

SUMMARY OF THE INVENTION

According to a first aspect, there is provided a method of reducing a set of instructions for execution on a processor, the method comprising: extracting information from a first instruction of the set of instructions; identifying unencoded space in one or more further instructions of the set of instructions; replacing the unencoded of the one or more further instructions with the extracted information bits of the first instruction so as to form one or more amalgamated instructions; and removing the first instruction from the set of instructions.

Suitably, extracting information comprises extracting information bits; identifying unencoded space comprises identifying unencoded bits; and replacing the unencoded space comprises replacing the unencoded bits.

Suitably, removing the first instruction from the set of instructions comprises deleting the first instruction from the set of instructions.

Suitably, each of the one or more further instructions is integral with another instruction.

Suitably, each of the one or more further instructions extends the operand of the instruction with which it is integral.

Suitably, the first instruction is integral with another instruction. Suitably, the first instruction extends the operand of the instruction with which it is integral.

Suitably, the method further comprises: identifying further unencoded bits in at least one of the one or more further instructions of the set of instructions; and replacing the further unencoded bits with an indicator for indicating to the processor which instruction in the set of instructions the extracted information bits are associated with.

Suitably, the method further comprises: storing the extracted information bits in a store; and fetching the extracted information bits from the store prior to the replacing step.

Suitably, the one or more further instructions are located prior to the first instruction in the set of instructions.

Suitably, each instruction in the set of instructions has an intermediate form and a final form, wherein an instruction in its intermediate form has a single component instruction, and an instruction in its final form has one or more component instructions, and the method further comprises converting each instruction from its intermediate form to its final form.

Suitably, information is extracted from the first instruction in its intermediate form, and unencoded space is identified in the one or more further instructions in their final form, and removing the first instruction from the set of instructions comprises removing at least one of the one or more component instructions of the first instruction in its final form from the set of instructions.

According to a second aspect, there is provided a reduction processor arranged to reduce a set of instructions for execution on an executing processor, the reduction processor arranged to: extract information from a first instruction of the set of instructions; identify unencoded space in one or more further instructions of the set of instructions; replace the unencoded space of the one or more further instructions with the extracted information bits of the first instruction so as to form one or more amalgamated instructions; and remove the first instruction from the set of instructions.

Suitably, the reduction processor is further arranged to: extract information bits; identify unencoded bits; and replace the unencoded bits.

Suitably, the reduction processor is arranged to remove the first instruction from the set of instructions by deleting the first instruction from the set of instructions.

Suitably, the reduction processor is further arranged to: identify further unencoded bits in at least one of the one or more further instructions of the set of instructions; and replace the further unencoded bits with an indicator for indicating to the processor which instruction in the set of instructions the extracted information bits are associated with.

Suitably, the reduction processor further comprises a store, wherein the reduction processor is further arranged to: store the extracted information bits in the store; and fetch the extracted information bits from the store prior to the replacing step.

According to a third aspect, there is provided a method of expanding a set of reduced instructions on a processor, the method comprising: fetching one or more amalgamated instructions of the set of reduced instructions; extracting information bits from the one or more amalgamated instructions, the extracted information bits being associated with a first instruction of the set of reduced instructions; fetching the first instruction; and assembling the extracted information bits and the first instruction to form an expanded instruction.

Suitably, the method comprises: storing the extracted information bits in a store; and on fetching the first instruction, retrieving the extracted information bits from the store.

Suitably the method further comprises reading an indicator of the one or more amalgamated instructions for indicating to the processor that the extracted information bits are associated with the first instruction.

Suitably, the method further comprises reading an identifier of the one or more amalgamated instructions for identifying to the processor which bits of the one or more amalgamated instructions are the information bits.

Suitably, the method further comprises on reading a predetermined bit sequence clearing the store.

Suitably, the method further comprises on reading a branch instruction clearing the store.

According to a fourth aspect, there is provided an expansion processor arranged to expand a set of reduced instructions, the expansion processor comprising: an instruction fetcher arranged to fetch instructions of the set of reduced instructions; an extractor arranged to extract information bits from one or more amalgamated instructions of the set of reduced instructions, the extracted information bits being associated with a first instruction of the set of reduced instructions; and an assembler arranged to assemble the extracted information bits and the first instruction to form an expanded instruction.

Suitably, the expansion processor further comprises a store, wherein the expansion processor is arranged to: store the extracted information bits in the store; and on fetching the first instruction, retrieve the extracted information bits from the store.

Suitably, the expansion processor is further arranged to read an indicator of the one or more amalgamated instructions for indicating to the processor that the extracted information bits are associated with the first instruction.

Suitably, the expansion processor is further arranged to read an identifier of the one or more amalgamated instructions for identifying to the processor which bits of the one or more amalgamated instructions are the information bits.

Suitably, the expansion processor is further arranged to clear the store on reading a predetermined bit sequence.

Suitably, the expansion processor is further arranged to clear the store on reading a branch instruction.

BRIEF DESCRIPTION OF THE DRAWINGS

The following disclosure will now be described by way of example with reference to the accompanying drawings. In the drawings.

DETAILED DESCRIPTION OF THE INVENTION

Known instruction sets are inefficient because many instructions include bits which are not encoded with information. The following discussion describes a method of modifying such instruction sets which reduces the number of unencoded bits and consequently increases the efficiency of the instruction set as a means of conveying information. By way of example the following discussion describes 16-bit long instructions. However, it is to be understood that the disclosure extends to instructions having different numbers of bits.

In the following discussion, the instructions are referred to as having information bits and unencoded bits. The information bits are the bits of the instruction which define the instruction which is subsequently executed by an executing processor. For example, if the instruction is an ADD instruction then the information bits include the bits which identify the instruction to be an ADD instruction and the bits which specify which registers are to be used. In other words, the information bits are encoded with the definition of the instruction. Unencoded bits are bits of an instruction which are unused. These bits do not encode any information. In prior art instruction sets, these bits are ignored both when constructing the instruction set and when executing it.

Figure 1:
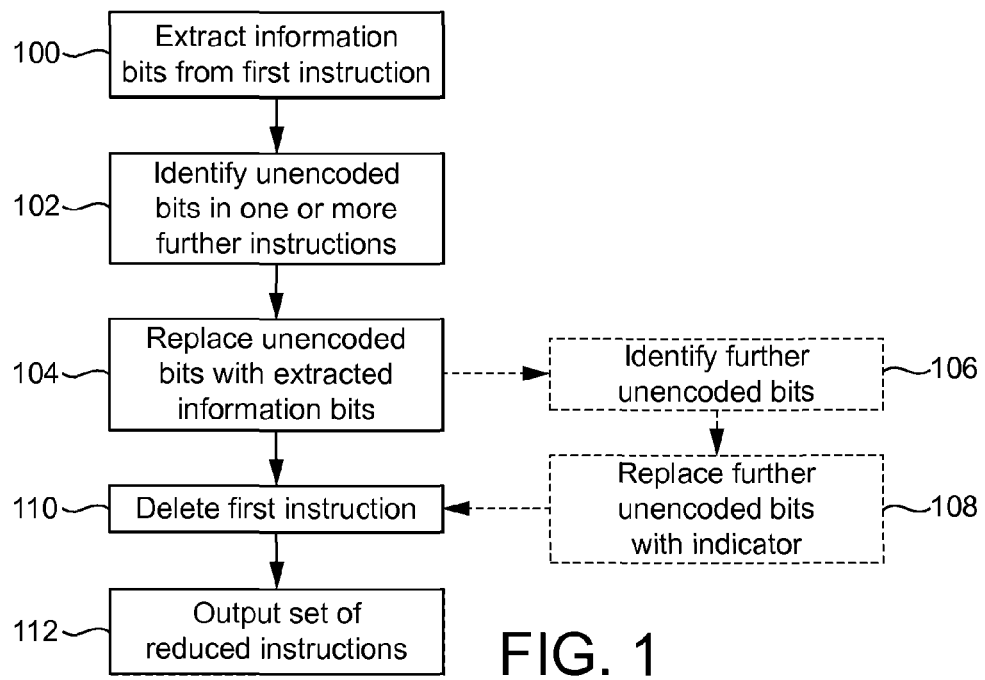
FIG. 1 is a flow diagram illustrating the method by which a processor reduces a set of instructions.

FIG. 1 illustrates in general terms the method by which a processor reduces a set of instructions so as to decrease the number of unencoded bits in the instruction set. It is to be understood that not all the steps in this figure are required, and that the steps may be performed in a different order to that depicted. For example, information bits may be extracted from the first instruction prior to identifying unencoded bits in one or more further instructions. Alternatively, unencoded bits may be identified in one or more further instructions prior to information bits being extracted from the first instruction. Initially the instruction set is written as normal and then subsequently processed in order to reduce the set of instructions.

At step 100 the processor extracts information bits from a first instruction of the instruction set. Preferably, all of the information bits of the first instruction are extracted at step 100. At step 102 the processor identifies unencoded bits in one or more further instructions of the instruction set. Suitably, the processor does this identifying step by starting at the first instruction and working backwards through the instruction set identifying those instructions that have spare encoding space (i.e. unencoded bits) as it goes. In other words, the one or more further instructions are located prior to the first instruction in the instruction set. At step 104 the processor replaces the unencoded bits of the one or more further instructions with the extracted information bits of the first instruction. The result is one or more amalgamated instructions. Each amalgamated instruction comprises the encoded bits of the further instruction and some or all of the information bits of the first instruction. Suitably, the processor adds the information bits of the first instruction to the next spare encoding space that it identifies in the instruction set. At step 110 the processor deletes the first instruction. The processor is able to delete the first instruction because all of the information bits of the first instruction have been incorporated into spare encoding space of other instructions to form amalgamated instructions. Consequently, the first instruction as a separate whole instruction is no longer required. At step 112 the processor outputs the set of reduced instructions.

Optionally, indicators indicating which instructions the information bits are associated with are included in the spare encoding space. This functionality is indicated in FIG. 1 by steps 106 and 108. At step 106 further unencoded bits in the one or more further instructions of the instruction set are identified. At step 108 the further unencoded bits are replaced with an instruction indicator. The instruction indicator is for indicating to the executing processor which instruction is associated with the extracted information bits. For example, the instruction indicator may include a sequence of bits that the receiving processor is configured to interpret as indicating which instruction is associated with the information bits. The receiving processor is then able to process the reduced instruction set accordingly.

Optionally, the processor may store the extracted information bits in a store and then fetch the extracted information bits from the store prior to replacing the unencoded bits of the one or more further instructions with the extracted bits.

Suitably, the one or more further instructions are prefixes. This is because prefixes often comprise unused bits which can be utilised by the method described above. As explained above, a prefix is an instruction which is associated with another instruction. A prefix is an instruction which is integral with another instruction. A prefix may be an instruction which forms a part of another instruction. A prefix may take one of many forms. For example, a prefix may include bits which are to be incorporated into the bits of another instruction. Generally, a prefix extends the operand of the instruction with which it is associated. For example a prefix may include bits which are interpreted by an executing processor as altering the meaning of another instruction.

Generally, the first instruction is an instruction which is not a prefix but which is associated with one or more instructions which are prefixes. The following discussion refers to such an instruction as a main instruction. However, the first instruction may be a prefix.

The one or more further instructions may be main instructions. This may occur if the main instructions have spare encoding space. Alternatively, the one or more further instructions may be a combination of both prefixes and main instructions.

The following detailed example describes an instruction set which consists of 16-bit short instructions. These instructions can be grouped into three classes:

1) short instructions which are prefixes;
2) short instructions which are not prefixes but which are associated with one or more short instructions which are prefixes (main instruction); and
3) short instructions which are isolated full instructions.

EXAMPLE

Consider an ADD instruction. This instruction is 16 bits long. The first 7 bits define the instruction to be an ADD instruction. The remaining 9 bits define the registers to be used in the instruction. An ADD instruction is often accompanied by a prefix instruction. The ADD instruction itself is therefore a main instruction as defined above. The prefix instruction is also 16 bits long. A prefix that accompanies an ADD instruction is generally used to increase the range of available registers. The use of this prefix may result in the 9 bits in the ADD instruction which would have otherwise have been used to define registers being unused. The method described above with respect to FIG. 1 enables these unused unencoded bits in the main instruction to be replaced by information bits of another instruction. For example, if two ADD instructions each use a prefix then the described method enables the prefix or main instruction of one of the ADD instructions to hold information bits for both of the ADD instructions. This means that the prefix of the other ADD instruction is not needed and can be deleted.

An alternative method by which a processor reduces a set of instructions is now described. Instructions may be generated by initially being in an intermediate form and then being converted to a final form. An instruction in its intermediate form is generally abstract in nature, for example 'An add instruction with registers A, B and C', whereas an instruction in its final form has a real, binary encoding. An instruction in an intermediate form has a single component instruction. An instruction in a final form has one or more component instructions. A main instruction may be one component instruction of an instruction in a final form. A prefix may be another component instruction of an instruction in a final form. The reduction processor converts instructions from their intermediate form to their final form.

In the context of FIG. 1, information may be extracted from a first instruction when that first instruction is in its intermediate form. Unencoded space may be identified in one or more further instructions, each of which is in its final form. The unencoded space in the one or more further instructions is then replaced with the extracted information from the first instruction so as to form one or more amalgamated instructions.

This method may enable a first instruction which would otherwise in its final form have had both a main instruction component and a prefix component, to no longer require the prefix component because the information which would have been in the prefix is instead in the one or more further instructions. Hence, the number of instructions in the final set of instructions is reduced compared to prior art methods. In other words, one or more of the component instructions of the first instruction in its final form (for example the prefix) is removed from the set of instructions.

This disclosure also relates to a reduction processor which is arranged to reduce a set of instructions as detailed above. The reduction processor is arranged to perform the method of FIG. 1.

Preferably, the reduction processor is implemented in software. Optionally, the reduction processor is implemented in hardware.

Figure 2:
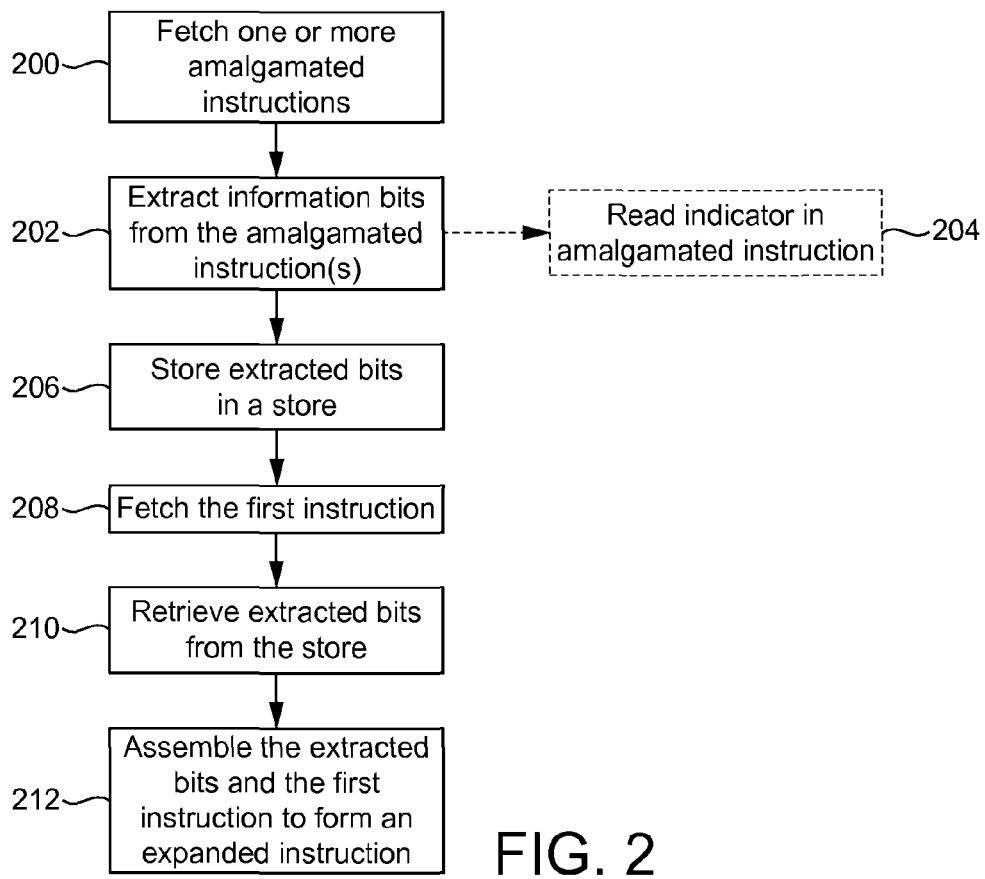
FIG. 2 is a flow diagram illustrating the method by which a processor expands a set of reduced instructions.

FIG. 2 illustrates in general terms the method by which a processor expands a set of instructions which have been reduced by the method illustrated in FIG. 1. It is to be understood that not all the steps in this figure are required, and that the steps may be performed in a different order to that depicted. For example, the one or more amalgamated instructions may be fetched prior to the fetching of the first instruction. Alternatively, the first instruction may be fetched prior to the fetching of the one or more amalgamated instructions.

Generally speaking, when instructions are received by a processor they are stored temporarily in a memory. An instruction fetcher then fetches the instruction from the memory and passes it to a kernel for processing. The following described method describes additional functionality whereby the processor is enabled to reconfigure instructions which have been manipulated into amalgamated instructions according to the method of FIG. 1 into instructions which are suitable for processing by the kernel.

In step 200 the instruction fetcher fetches one or more amalgamated instructions of the set of reduced instructions. At step 202 the processor extracts information bits from the one or more amalgamated instructions. The information bits which are extracted are those that are associated with a first instruction of the set of reduced instructions. At step 206 these extracted information bits are stored in a store. At step 208 the instruction fetcher fetches the first instruction of the reduced instruction set. At step 210 the extracted information bits associated with the first instruction are retrieved from the store. At step 212 the processor assembles the extracted information bits and the first instruction to form an expanded instruction. This expanded instruction may then be passed to the kernel for processing. Suitably, the resulting expanded set of instructions takes the same form as the initial set of instructions prior to processing to form the reduced set of instructions by the method of FIG. 1.

Optionally, the processor additionally reads an indicator in the amalgamated instruction as shown at step 204. The indicator may identify to the processor which bits of the one or more amalgamated instructions are the information bits to be extracted. Alternatively or in addition, the indicator may indicate to the processor which instruction the extracted information bits are associated with.

Preferably, the processor is implemented in hardware. Optionally, the processor is implemented in software.

If the indicator identifies to the processor which bits of the one or more amalgamated instructions are the information bits to be extracted, then the processor uses this information to pass the indicated bits to the store on reading the indicator. If the indicator indicates to the processor which instruction the extracted information bits are associated with, then the processor uses this information to retrieve the information bits and append them to the designated instruction on receiving that designated instruction so as to form a complete instruction.

Optionally, further bit sequences may be defined by the protocol of the reduced instruction set which when read by the processor causes the processor to carry out a particular operation. For example, the protocol may define a bit sequence which is interpreted by the processor as an instruction to clear the store. On receiving this predetermined bit sequence the processor deletes the information bits currently stored in the store. The protocol may further define that an instruction known to the processor for carrying out a particular operation is also to be interpreted by the processor as an instruction to clear the store. For example, on receiving a branch instruction the processor may be configured to both carry out the branch operation and also clear the store.

EXAMPLE

The following table illustrates an example list of consecutive instructions:

| Encoded instruction (Z = unused) | Store | Explanation |
|---|---|---|
| 0x020Z | xxxx | 4 unused bits stored |
| 0xF238 0x01ZZ | xxxxxxxxxxxx | 8 unused bits stored |
| 0x52E8 | xxxx | 8 bits consumed, for example to extend the range of registers |
| 0x4212 | xxxx | unchanged |
| 0xF782 0x23ZZ | xxxxxxxxxxxx | 8 unused bits stored |

In this table, the x entries refer to bits added to the store. The example encoded instructions are shown in hexadecimal format. Z refers to bits which are unused in the instruction into which they are incorporated and which are instead information bits associated with another instruction. The instruction fetcher is configured to pass certain information bits of an amalgamated instruction to the store rather than to the kernel under prescribed conditions. The processor employs a predetermined method in order to identify: which bits to extract from the amalgamated instructions to pass to the store; which bits to retrieve from the store; and which instructions to incorporate those retrieved bits into. These identifications may occur by means of indicators incorporated into the amalgamated instructions. Alternatively, these identifications may occur by other suitable means. If application of this predetermined method indicates that a subsequent instruction is to use the store, then that instruction consumes a predetermined number of bits from the store. The remaining bits in the store are reserved for future instructions. The number of bits in the store may be increased by addition from subsequent instructions with spare encoding space that has been replaced with information bits of other instructions. The number of bits in the store may be decreased by subsequent instructions that consume bits of the store.

The first entry in the table is a 16-bit instruction. The first four bits of this instruction are illustrated by a Z which indicates that they are unused in the 16-bit instruction. These bits have been replaced with information bits extracted from another instruction as explained with reference to FIG. 1. On receipt of this 16-bit instruction, the instruction fetcher identifies that the four Z bits are associated with another instruction and extracts these bits. These extracted bits are stored in the store, indicated by the four x entries in the "store" column. The underscore in the table illustrates that these bits are newly added into the store.

The second entry in the table is two 16-bit instructions. The first 16-bit instruction Ox01ZZ has eight bits which are unused as illustrated by the two Zs. On receipt of these instructions, the instruction fetcher identifies that the eight Z bits are associated with another instruction and extracts these bits. These extracted bits are stored in the store, indicated by the eight underscored x entries in the "store" column. The store now has a total of 12 stored bits.

The third entry in the table is a 16-bit instruction. Application of the predetermined method explained above identifies to the processor that this instruction is one which is to be supplemented with information bits from the store. The instruction consumes eight bits from the store. The store now has four information bits remaining in it as illustrated by the entry in the store column.

The fourth entry in the table is a 16-bit instruction. This instruction has no information bits associated with another instruction to add to the store, nor does it consume any such information bits from the store. The number of x entries in the store therefore remains unchanged at four which are the same four as were there prior to receipt of the fourth instruction.

The fifth entry in the table is two 16-bit instructions. The first 16-bit instruction Ox23ZZ has eight bits which are unused as illustrated by the two Zs. On receipt of these instructions, the instruction fetcher identifies that the eight Z bits are associated with another instruction and extracts these bits. These extracted bits are stored in the store, indicated by the eight underscored x entries in the "store" column. The store now has a total of 12 stored bits.

This disclosure also relates to an expansion processor which is arranged to expand a set of instructions which has been reduced according to the method of claim 1. The expansion processor is arranged to perform the method of FIG. 2.

Preferably, the expansion processor is implemented in hardware. Optionally, the expansion processor is implemented in software.

Known instruction sets include instructions comprising unencoded bits. This is particularly the case when prefixes are used in the instruction set. These unencoded bits are not removed in order to maintain alignment of the instructions in the instruction set and synchronisation with the processor which is to execute the instructions. The methods described herein utilise these otherwise unutilised unencoded bits by replacing them with information bits of other instructions. This enables some other instructions in the instruction set to be deleted and therefore enables the use of fewer instructions to carry the same data. The protocol described herein is therefore more efficient than the prior art methods described. Since the length of the individual instructions is not modified, alignment of the instructions in the instruction set and synchronisation with the executing processor is maintained.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of reducing a set of instructions for execution on a processor, the method comprising:
   extracting information bits from a first instruction of the set of instructions;
   identifying unencoded bits in one or more further instructions of the set of instructions;
   replacing the unencoded bits of the one or more further instructions with the extracted information of the first instruction so as to form one or more amalgamated instructions;
   removing the first instruction from the set of instructions;
   identifying further unencoded bits in at least one of the one or more further instructions of the set of instructions; and
   replacing the further unencoded bits with an indicator for indicating to the processor which instruction in the set of instructions the extracted information bits are associated with.

2. A method as claimed in claim 1, wherein removing the first instruction from the set of instructions comprises deleting the first instruction from the set of instructions.

3. A method as claimed in claim 1, wherein each of the one or more further instructions is integral with another instruction.

4. A method as claimed in claim 3, wherein each of the one or more further instructions extends the operand of the instruction with which it is integral.

5. A method as claimed in claim 1, wherein the first instruction is integral with another instruction.

6. A method as claimed in claim 5, wherein the first instruction extends the operand of the instruction with which it is integral.

7. A method as claimed in claim 1, wherein each instruction in the set of instructions has an intermediate form and a final form, wherein an instruction in its intermediate form has a single component instruction, and an instruction in its final form has one or more component instructions, the method further comprising converting each instruction from its intermediate form to its final form.

8. A method as claimed in claim 7, wherein information is extracted from the first instruction in its intermediate form, and unencoded space is identified in the one or more further instructions in their final form, and wherein removing the first instruction from the set of instructions comprises removing at least one of the one or more component instructions of the first instruction in its final form from the set of instructions.

9. A reduction processor arranged to reduce a set of instructions for execution on an executing processor, the reduction processor comprising processor-executable instructions stored in non-transitory processor readable form which, when executed cause the reduction processor, cause the reduction processor to:
   extract information bits from a first instruction of the set of instructions;
   identify unencoded bits in one or more further instructions of the set of instructions;
   replace the unencoded bits of the one or more further instructions with the extracted information of the first instruction so as to form one or more amalgamated instructions;
   remove the first instruction from the set of instructions;
   identify further unencoded bits in at least one of the one or more further instructions of the set of instructions; and
   replace the further unencoded bits with an indicator for indicating to the processor which instruction in the set of instructions the extracted information bits are associated with.

10. A reduction processor as claimed in claim 9, arranged to remove the first instruction from the set of instructions by deleting the first instruction from the set of instructions.

11. A method of expanding a set of reduced instructions on a processor, the method comprising:
    fetching one or more amalgamated instructions of the set of reduced instructions;
    extracting information bits from the one or more amalgamated instructions, the extracted information bits being associated with a first instruction of the set of reduced instructions;
    fetching the first instruction;
    assembling the extracted information bits and the first instruction to form an expanded instruction; and
    reading an indicator of the one or more amalgamated instructions for indicating to the processor that the extracted information bits are associated with the first instruction.

12. A method as claimed in claim 11, further comprising reading an identifier of the one or more amalgamated instructions for identifying to the processor which bits of the one or more amalgamated instructions are the information bits.

13. An expansion processor arranged to expand a set of reduced instructions, the expansion processor comprising processor-executable instructions stored in non-transitory processor readable form which, when executed cause the reduction processor, cause the reduction processor to:
    fetch instructions of the set of reduced instructions;
    extract information bits from one or more amalgamated instructions of the set of reduced instructions, the extracted information bits being associated with a first instruction of the set of reduced instructions;
    assemble the extracted information bits and the first instruction to form an expanded instruction; and
    read an indicator of the one or more amalgamated instructions for indicating to the processor that the extracted information bits are associated with the first instruction.

14. An expansion processor as claimed in claim 13, further arranged to read an identifier of the one or more amalgamated instructions for identifying to the processor which bits of the one or more amalgamated instructions are the information bits.

* * * * *